United States Patent [19]

Mathy et al.

[11] Patent Number: 6,113,868
[45] Date of Patent: Sep. 5, 2000

[54] PROCESS FOR TREATING TUNGSTATE SOLUTIONS TO REDUCE MOLYBDENUM IMPURITY AND OTHER IMPURITY CONTENT

[75] Inventors: Wolfgang Mathy, Langelsheim; Wilfried Gutknecht, Goslar, both of Germany

[73] Assignee: H. C. Starck GmbH & Co. KG, Goslar, Germany

[21] Appl. No.: 09/214,284

[22] PCT Filed: Jul. 1, 1997

[86] PCT No.: PCT/EP97/03438

§ 371 Date: Dec. 31, 1998

§ 102(e) Date: Dec. 31, 1998

[87] PCT Pub. No.: WO98/01393

PCT Pub. Date: Jan. 15, 1998

[30] Foreign Application Priority Data

Jul. 5, 1996 [DE] Germany ............ 196 27 063

[51] Int. Cl.[7] ................................... B01D 11/00
[52] U.S. Cl. .................. 423/54; 423/55; 423/87
[58] Field of Search .............. 423/54, 55, 92, 423/87

[56] References Cited

U.S. PATENT DOCUMENTS

| | | | |
|---|---|---|---|
| 3,173,754 | 3/1965 | Kurtak. | |
| 3,969,484 | 7/1976 | Onozaki et al. | 423/55 |
| 4,115,513 | 9/1978 | Kulkarni et al. | 423/54 |
| 4,279,869 | 7/1981 | Coulson | 423/54 |
| 4,288,413 | 9/1981 | MacInnis et al. | 423/54 |
| 5,676,817 | 10/1997 | Gutknecht et al. | 423/55 |
| 5,891,407 | 4/1999 | Gutknecht et al. | 423/54 |

FOREIGN PATENT DOCUMENTS

| | | |
|---|---|---|
| WO96/41767 | 12/1996 | Germany. |
| 8003651 | 5/1981 | South Africa. |

*Primary Examiner*—Steven P. Griffin
*Assistant Examiner*—Michael Rhee
*Attorney, Agent, or Firm*—Perkins, Smith&Cohen, LLP; Jerry Cohen

[57] ABSTRACT

Tungstate solutions are purified by a precipitation process followed by two anion exchange processes to reduce molybdenum and arsenic impurity content. The precipitation involves acidification of the original highly basic tungstate solution to pH of 7 to 10 without addition of precipitating agents and separates out the bulk of impurities other than Mo, As. The first anion exchange process removes As. Then a remaining filtrate from the latter process is treated with sulfides to form thiomolybdates from impurity Mo content and the thiomolybdates are then separated out from the tungstate solution in a second anion exchange process.

7 Claims, No Drawings

PROCESS FOR TREATING TUNGSTATE SOLUTIONS TO REDUCE MOLYBDENUM IMPURITY AND OTHER IMPURITY CONTENT

FIELD AND BACKGROUND OF THE INVENTION

The present invention relates to a process for the preparation of pure alkali metal and/or ammonium tungstate solutions from alkaline tungstate solutions contaminated especially with silicon, phosphorus, arsenic, tin, antimony, vanadium, tantalum, niobium, titanium and molybdenum, wherein the solution is acidified and the precipitate, formed without the addition of precipitating agents or precipitating aids, is then filtered off.

The raw materials for the recovery of tungsten, especially its ores, always contain small amounts of molybdenum and arsenic. Although the products ammonium paratungstate and powdered tungsten metal arc currently required to have very low Mo and As contents. tungsten raw materials with higher molybdenum contents of more than 2 wt. %, based on tungsten, are increasingly entering the market.

The tungstate-containing solutions from the various digestion processes are contaminated with a number of different elements, depending on the raw material. Apart from molybdenum, the most frequently occurring impurities are phosphorus, arsenic, silicon, aluminium, vanadium, titanium, niobium and tantalum. Various precipitation processes are known for separating off these impurities typically, such processes involve, wherein, after the addition to a tungstate solution of precipitating agents such as magnesium chloride or sulfate or precipitating aids such as aluminium sulfate. The pH of the previously strongly alkaline tungstate solution is lowered to values of between 8 and 11. However, these precipitation processes cannot be carried out quantitatively, most of the arsenic, in particular, remaining in solution (Tungsten Symposium, San Francisco, June 1982, p. 77, Table 2).

Currently the most common process for the separation of molybdenum from tungstate solutions is precipitation as $MoS_3$ from the previously purified tungstate solution (Gmelin, Tungsten, System no. 54, Supplement A1 (1979), pages 44 to 46). tungstate solution originating from the alkaline digestion is treated with NaHS at pH 8 to 10 and, after the formation of $MoS_4^{2-}$, is precipitated as $MoS_3$ with $H_2SO_4$ at a pH of 2 to 3. This precipitate normally includes approximately the same amount of tungsten as molybdenum and contains appreciable amounts of free sulfur and the arsenic.

Such a precipitation product can scarcely be used profitably and must therefore often be dumped as special waste. Furthermore the pH adjustment can only be effected with mineral acids, producing large amounts of neutral salt.

Mintek Report no. M 226 (25.11.1985) describes a process in which the $MoS_4^{2-}$ is separated off with solid ion exchangers in the OH form. The disadvantages of this process are the low Mo absorption capacity of the ion exchangers, the lower degree of separation of the molybdenum from the tungsten, and the arsenic contained in the $MOS_3$ precipitation product.

According to U.S. Pat. No. 4,288,413 the molybdenum is separated off as $MoS_4^{2-}$ by extraction with quaternary ammonium compounds at pH values of between 7 and 9.

As arsenic is also extracted under these conditions, it can be separated from the tungsten but not from the molybdenum. Because the $MoS_4^{2-}$ can only be stripped by means of oxidative additives like $H_2O_2$ or NaOCl, no separation from the co-extracted tungsten takes place and the W losses are increased. The product is simply a mixture of sodium molybdate and sodium tungstate which is difficult to utilize further and which is also contaminated with arsenic.

One procedure for avoiding the As contamination is disclosed in German Patent DE-C 195 00 057, although nothing is said about contamination of the tungstate solutions by molybdenum.

The object of the present invention is to provide a process which makes it possible selectively to free tungstate solutions of impurities, but simultaneously to produce the minimum amount of waste, particularly special waste. It should be possible to obtain an economically usable molybdenum product from the Mo content. The above-stated object can be achieved by combining a precipitation process with two anion exchanger processes.

This invention provides a process for the preparation of pure alkali metal and/or ammonium tungstate solutions from alkaline tungstate solutions contaminated especially with silicon, phosphorus, arsenic, tin, antimony, vanadium, tantalum, niobium, titanium and molybdenum, wherein the solution is acidified. The precipitate is formed without the addition of precipitating agents or precipitating aids. The precipitate is then filtered off. The process is characterized in that the acidification is carried out to a pH range of 7 to 10, the bulk of the impurities, excluding the molybdenum and arsenic ions, being precipitated and filtered off, the remaining impurities, including the arsenic but excluding the molybdenum ions, being separated from the filtrate by means of a weakly to moderately basic ion exchanger. This filtrate is treated with sulfides to form thiomolybdates, and these thiomolybdates are separated off by means of a solid or liquid ion exchanger in the sulfide form to give the pure alkali metal and/or ammonium tungstate solution.

The acidification to a pH range of 7 to 10 is preferably carried out by means of mineral acid(s), $CO_2$ and/or membrane electrolysis, the pH preferably being adjusted to 8 to 8.5. This inevitably causes precipitation. This precipitation can be carried out without the addition of precipitating agents or precipitating aids. After filtration, the first exchange step then takes place by means of the weakly to moderately basic ion exchanger. This is preferably carried out using a solid, weakly to moderately basic ion exchanger in the OH form, i.e. an ion exchanger predominantly containing tertiary ammonium groups as active components. This exchange step enables the impurities arsenic, phosphorus, silicon, vanadium, titanium, niobium and tantalum to be separated off better than by any known type of precipitation. This applies particularly to arsenic, which remains in solution when precipitation methods are employed. The eluates obtained on regeneration of the ion exchanger contain said impurities in 10-fold concentrated form, so they can be precipitated in a shorter time with a reduced expenditure on chemicals. This concentration procedure also makes the arsenic precipitable. The remaining $WO_4^{2-}$ containing solution is advantageously recycled upstream of the first exchange step.

In experiments with commercially available ion exchangers, it was established, surprisingly, that the conversion of anion exchangers in the OH form to the sulfide form markedly increases the absorption capacity and selectivity for molybdenum. This applies especially to weakly basic anion exchangers (e.g. Lewatit MP 62 from Bayer AG). Although Mo can also be separated off with moderately to strongly basic anion exchangers, molybdenum is increasingly difficult to elute as the basicity increases. The $H_2S$ gas which can be used to activate the ion exchanger can be extensively recycled, being recovered with $H_2O$ in gas scrubbers during the acidification in the process steps following the exchange step, and used for the next cycle in the activation of the ion exchanger. A pure, low-arsenic $MoS_3$ can be precipitated from the eluate of this second exchange step by acidification.

The process according to the invention can advantageously be applied by starting with alkaline solutions from the various digestion processes (e.g. autoclave, melt., calcination), where tungsten contents are preferably adjusted to 80 to 100 g/l. After the above-described precipitation of the impurities by acidification, a further purification can advantageously be carried out with a weakly basic anion exchanger in order to separate off the residual impurities after precipitation, as well as the arsenic and the phosphorus. The solution purified beforehand in this way is then advantageously treated with 3 to 5 times the stoichiometric amount of sulfides, based on the molybdenum, in order to form the thiomolybdates. The sulfides used for this purpose are preferably $H_2S$, NaHS, $Na_2S$, $(NH_4)_2S$ or sulfide-releasing organic compounds. This solution is preferably stirred for several hours, preferably 4 to 10 hours, at elevated temperature, preferably 50 to 95° C., the pH advantageously being adjusted to values of 8 to 8.5 with mineral acid or $CO_2$. This solution is then advantageously passed upwards through an exchanger column packed with weakly basic anion exchanger. the latter having been pretreated with $H_2S$/water to a pH of <7 for conversion to the sulfide form.

When the absorption capacity is reached, breakthrough begins. The loading process is then stopped and the exchanger is washed until extensively free of tungstate and is subsequently eluted with dilute sodium hydroxide solution. The exchanger is then washed with water.

The column is preferably eluted and washed downwards. The eluted exchanger is then reactivated to pH values of <7 with $H_2S$/water from the off-gas scrubber and is thus ready for the next cycle.

The purified tungstate solution can be acidified further by means of mineral acid, $CO_2$ or membrane electrolysis and processed further by known methods. Thus, after the application of an extraction process, the tungsten content can be processed further to ammonium paratungstate.

The molybdenum-containing eluate is preferably adjusted to a pH of 2 to 3 with mineral acid, the molybdenum then being precipitated as $MoS_3$. Because of the previous removal of arsenic from the tungstate solutions by means of the first exchange step, this $MoS_3$ is pure, contains only a little tungsten and can be used in molybdenum metallurgy.

The $H_2S$ gas produced on acidification of the tungstate solutions and the eluates is preferably trapped with $H_2O$ in bgas scrubbers and used to activate the anion exchanger.

DETAILED DESCRIPTION OF THE
PREFERRED EMBODIMENTS

The invention is described below by way of Examples without thereby implying a limitation.

EXAMPLES
1. Lewatit MP 62 in OH form
(weakly basic anion exchanger containing predominantly tertiary exchange groups—commercial product from Bayer AG)

| Exchanger column: | 300 ml of Lewatit MP 62 in OH form | |
|---|---|---|
| Starting solution: | 11 l of solution containing | 85.0 g/l of tungsten 1.97 g/l of Mo (= 2.3% of Mo based on W) pH 8.1 |

The solution was passed upwards through the exchanger column at a rate of 0.5 bed volume per hour (150 ml/h).

| Purified solution: | 11 l of solution containing | 84.1 g/l of tungsten 26 mg/l of Mo (= 309 ppm of Mo in the W) pH 8.5 |
|---|---|---|

The exchanger was washed with ca. 0.5 l of $H_2O$ to remove the W, eluted downwards with 0.5 l of NaOH (100 g/l) at a rate of 1 BV/h and then washed to pH 8 with $H_2O$ (ca. 1 l of wash water) (BV=bed volume).

| Eluate: | 1 l of solution containing | 8.7 g/l of tungsten 19.04 g/l of Mo |
|---|---|---|

0.5 l of the eluate was adjusted to pH 2 with 35 ml of sebmiconcentrated $H_2SO_4$ and stirred for ca. 3 hours at 70° C. and the precipitate was filtered off with suction, washed and dried.

| Precipitate: | 24.3 g containing | 35.9% of molybdenum 1.35% of tungsten |
|---|---|---|
| Filtrate: | 500 ml of solution containing | 8.22 g/l of tungsten 0.047 g/l of Mo |

2. Lewatit MP 62 in $S^{2-}$ Form

| Exchanger column: | 300 ml of Lewatit MP 62 in $S^{2-}$ form | |
|---|---|---|
| Starting solution: | 12 l of solution containing | 80.9 g/l of tungsten 1.92 g/l of Mo (= 2.3% of Mo based on W) pH 8.0 |

The solution was passed upwards through the exchanger column at a rate of 0.5 bed volume (BV) per hour (150 ml/h).

| Purified solution: | 12 l of solution containing | 79.3 g/l of tungsten 6.7 mg/l of Mo (= 84 ppm of Mo in the W) pH 8.4 |
|---|---|---|

The exchanger was washed with water and eluted:

| Eluate: | 1 l of solution containing | 13.1 g/l of tungsten 23.9 g/l of Mo |
|---|---|---|

The combined Mo content of the purified solution and the eluate is somewhat higher than the initial amount because a further 3 l of solution passed through the column, but the breakthrough occurred after 12 l.

0.5 l of the eluate was processed further as in Example 1:

| Precipitate: | 27.5 g containing | 39.1% of molybdenum |
| --- | --- | --- |
| | | 2.65% of tungsten |
| Filtrate: | 600 ml of solution containing | 8.86 g/l of tungsten |
| | | 0.46 g/l of Mo |
| | | pH 1.74 |

3. Comparison of the Qualities of the Precipitated $MoS_3$ with and without Prior Separation of As

| Starting solution: | 70 g/l of W |
| --- | --- |
| | 1.2 g/l of Mo |
| | 13 mg/l of As |
| | pH 8.3 |

3.1 Comparative Example: Separation of Mo Exclusively by Means of Lewatit MP 62 in OH Form According to Example 1. State of the Art: Mintek Rep. No. 226

| Recovered $MoS_3$: | 39.7% of Mo |
| --- | --- |
| | 3.8% of W |
| | 3000 ppm of As |

3.2 Process According to the Invention

Prior purification with weakly basic anion exchanger in OH form (Lewatit MP 62)

| Purified W solution: | 60 g/l of W |
| --- | --- |
| | 1.2 g/l of Mo |
| | <1 mg/l of As |
| | pH 8.6 |

Separation of Mo by means of Lewatit MP 62 in $S^{2-}$ form (according to Example 2)

| Recovered $MoS_3$: | 40.6% of Mo |
| --- | --- |
| | 0.6% of W |
| | 60 ppm of As |

What is claimed is:

1. A process for purifying highly basic tungstate solutions comprising the steps of:
   (a) acidifying the solution to a pH of 7 to 10 by a process selected from the group consisting of addition of one or more mineral acid, addition of carbon dioxide, membrane electrolysis and non-additive precipitation processes and filtering out the precipitate to thereby substantially remove impurity content other than molybdenum and arsenic,
   (b) subjecting the resultant filtrate from step (a) to a first anion exchange process using a weakly to moderately basic ion exchange, to thereby substantially remove arsenic impurity content, and
   (c) treating the filtrate by adding one or more sulfides thereto to form thiomolybdates from impurity content thereof and then subjecting the resultant filtrate from step (b) to a second anion exchange to thereby substantially remove molybdenum content.

2. A process according to claims 1, wherein the pH is adjusted to 8 to 8.5.

3. A process according to either of claims 2 or 1, wherein said first anion exchange process comprises using solid, weakly to moderately basic ion exchangers in the OH form.

4. A process according to claim 3, wherein the amount of sulfide added to form the thiomolybdates is 3 to 5 times the stoichiometric amount of molybdenum.

5. A process according to either of claims 2 or 1, wherein the sulfides used are $H_2S$, NaHS, $Na_2S$, $(NH_4)_2S$ or sulfide-releasing organic compounds.

6. A process according to either of claims 2 or 1 wherein the amount of sulfide added to form the thiomolybdates is 3 to 5 times the stoichiometric amount of molybdenum.

7. A process according to claim 6 wherein the added sulfide comprises one or more sulfides selected from the group consisting of $H_2S$ NaHS, $(NH_4)_2S$ and sulfide-releasing organic compounds.

* * * * *